United States Patent [19]
Chern et al.

[11] Patent Number: 4,815,800
[45] Date of Patent: * Mar. 28, 1989

[54] FLARE REDUCTION IN HOLOGRAMS

[75] Inventors: Mao-jin J. Chern, Rancho Palos Verdes; John E. Wreede, Monrovia, both of Calif.

[73] Assignee: Hughes Aircraft Company, Los Angeles, Calif.

[ * ] Notice: The portion of the term of this patent subsequent to Aug. 18, 2004 has been disclaimed.

[21] Appl. No.: 684,538

[22] Filed: Dec. 21, 1984

[51] Int. Cl.$^4$ .......................... G02B 5/32; G03H 1/02
[52] U.S. Cl. ...................................... 350/3.7; 350/320
[58] Field of Search ................ 430/1, 2; 350/3.6, 361, 350/3.7, 320

[56] References Cited

U.S. PATENT DOCUMENTS

| | | | |
|---|---|---|---|
| 2,947,626 | 8/1960 | Famely et al. | 96/34 |
| 3,012,886 | 12/1961 | Lerner | 96/33 |
| 3,940,204 | 2/1976 | Withrington | |

FOREIGN PATENT DOCUMENTS

| | | |
|---|---|---|
| 043993 | 1/1982 | European Pat. Off. . |
| 2249364 | 5/1975 | France . |
| 5719084 | 2/1983 | Japan . |
| 1371121 | 10/1974 | United Kingdom . |

OTHER PUBLICATIONS

Beesley M. J. et al., "The Use of Photoresist as a Holographic Recording Medium." Applied Optics, vol. 9 No. 12, Dec. 1970 pp. 2720–2724.

Applied Physics, vol. 10, No. 1, May 1976, S. Case et al.: "Index Modulation and Spatial Harmonic Generation in Dichromated Gelatin Films", pp. 41–51.

Proceedings of the SPIE, vol. 215, "Recent Advances in Holography", 1980, Published by SPIE (Palos Verdes, Cal., U.S.), S. McGrew: "Color Control in Dichromated Gelatin Reflection Holograms", pp. 24–31.

Optics and Laser Technology, vol. 5, No. 4, Aug. 1973; R. McPhedran: "Profile Formation in Holographic Diffraction Gratings", pp. 166–171.

Applied Optics, vol. 10, No. 3, Mar. 1971, K. Biedermann: "Attempts to Increase the Holographic Exposure Index of Photographic Materials" pp. 584–595.

Optics Communications, vol. 43, No. 2, Sep. 1982, R. Syms et al. "Noise Gratings in Photographic Emulsions", pp. 107–110.

Photographic Science and Engineering, vol. 28, No. 5, Oct. 1984 (Easton, Pa., U.S.), S. Sjolinder. "Swelling of Dichromated Gelatin Film", pp. 180–184.

IEEE Journal of Quantum Electronics, vol. QE-4, No. 11, Nov. 1968; A Mikaelian et al.: "Holograms on Photochromic Films", pp. 757–762.

Applied Optics, vol. 18, No. 14, Jul. 15, 1979, B. Chang et al.: "Dichromated Gelatin for the Fabrication of Holographic Optical Elements", pp. 2407–2417.

Nouvelle Revue d'Optique, vol. 4, No. 5, Dec. 1973; J. J. Clair et a.: "Etude Experimentale des Proprietes Optiques des Photoresines; Etude et Analyse de Phenomenes Lies a la preexposition", pp. 353–355.

*Primary Examiner*—Burce Y. Arnold
*Attorney, Agent, or Firm*—Leonard A. Alkov; A. W. Karambelas

[57] ABSTRACT

A holographic recording medium is treated to reduce or eliminate unwanted extraneous diffraction and flare. Regions adjacent surfaces of the medium are desensitized to reduce contrast in the holographic fringe pattern along the surfaces, thereby eliminating planar phase grating effects. Treatments include applying a burst of gas or vapor to the surfaces of the medium, irradiating the surfaces with highly absorbed incoherent light, thermally treating the medium as it is built up from sequentially applied layers, building up layers of different concentrations of light-sensitive matrial, and developing diffusion regions at interfaces of layers within the holographic recording medium.

26 Claims, 2 Drawing Sheets

U.S. Patent    Mar. 28, 1989    Sheet 2 of 2    4,815,800
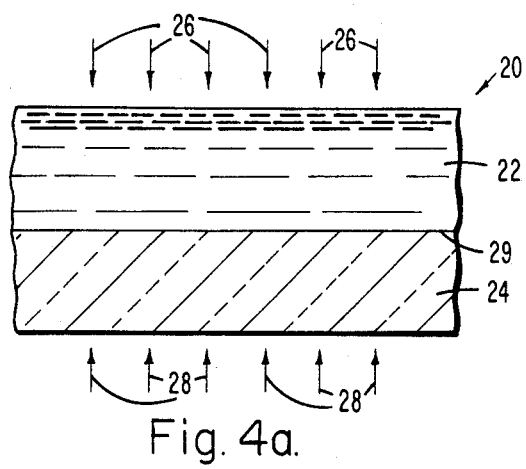
Fig. 4a.
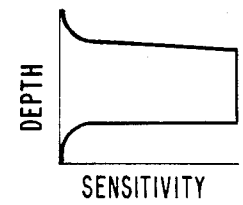
Fig. 4b.
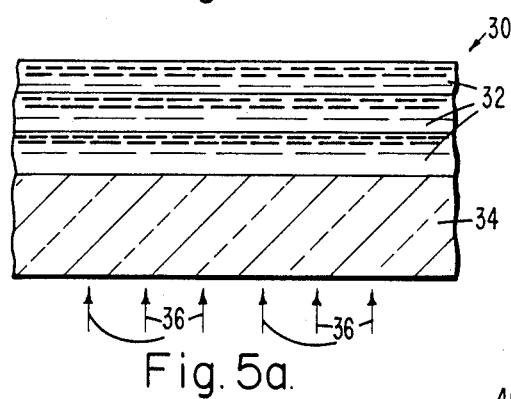
Fig. 5a.
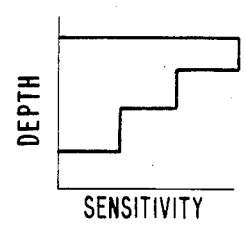
Fig. 5b.
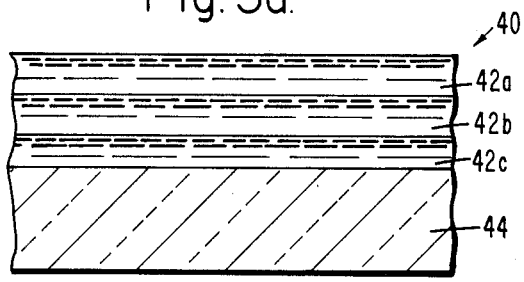
Fig. 6a.
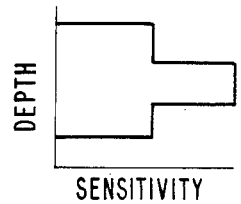
Fig. 6b.
Fig. 7a.
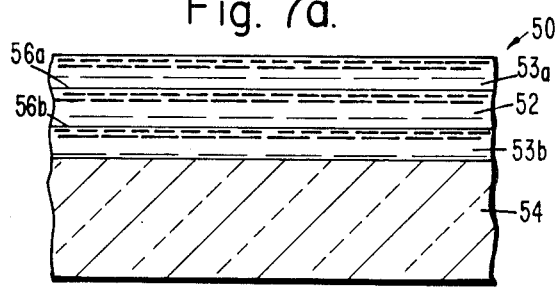
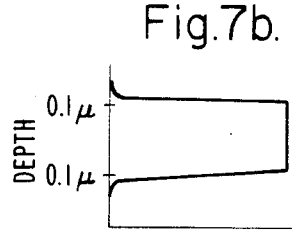
Fig. 7b.

FLARE REDUCTION IN HOLOGRAMS

BACKGROUND OF THE INVENTION

1. Field of the Invention

This invention relates generally to holography and more particularly has reference to improving holograms by eliminating or minimizing unwanted flare effects.

2. Description of the Prior Art

In modern aircraft, both military and commercial, it is important that certain information be clearly and unobtrusively presented to the pilot while he is viewing the outside world. The head-up display (HUD) has been developed for this purpose and provides relevant scale, alphanumerics, symbology, gun sight reticle (in fighter aircraft) and other information displays superimposed on the pilot's forward field of view. With conventional HUD designs, the information display is generated on a high-brightness cathode ray tube and projected through a relay lens system to a transparent combiner screen, typically a partially silvered mirror, which is located between the pilot and the aircraft windscreen. The combiner reflects the projected images to the pilot's eyes while affording him an unobstructed view of the outside world through the combiner and windscreen.

One combiner recently developed for head-up displays includes a holographic film for reflection of the projected image. This film comprises one or more layers of photoreactive gelatin which have been exposed by a holographic process to record a holographic fringe pattern therein. A holographic film has better reflection and see-through capability than a partially silvered mirror.

In making reflection holograms, a thin layer of photoreactive gelatin on a glass substrate is exposed to in-phase laser beams of opposite direction which intersect at the gelatin layer. The intersecting beams set up an interference pattern which is recorded in the gelatin as a sinusoidal modulation of the index of refraction of the gelatin. A pattern of holographic fringes corresponding to the modulation of the index of refraction defines the hologram. The fringes are parallel to the line bisecting the angle between the two laser beams. Where the bisector is parallel to the surface of the gelatin, the fringes are parallel to the surface. Where the bisector is at an acute angle to the surface, the fringes are slanted.

Transmission holograms are produced by laser beams which are directed at the gelatin from the same side. If the bisector of the beams is perpendicular to the gelatin surface, the fringes are also perpendicular to the surface.

It is usually desirable to construct a hologram with zero degree fringes, i.e., fringes that are parallel to the surface of the gelatin. However, design constraints occasionally prevent that arrangement. In those cases, the fringes intersect the surface and form a slant fringe pattern. One problem with slant fringe holograms is that they produce extraneous diffraction images which are analogous to the diffraction produced by a transmission hologram. We call the extraneous diffraction "flare". The extraneous diffraction is caused by surface effects. The desired hologram formed by the volume holographic fringes is aligned at an angle and intersects the surface of the holographic material to form a thin phase grating therealong. This surface effect is completely different from surface deformation effects which can be eliminated by index matching and is also completely different from surface reflection flare which can be removed by selectively moving components of the hologram construction system during recording (See U.S. Pat. Nos. 4,456,328; 4,458,977 and 4,458,978). Procedures described in the literature for making a holographic exposure at a shortened wavelength, e.g., 4880 Å v. 5145 Å, had an incidental effect on slant fringe flare but were never recognized as acheiving that result. Zero degree holograms are not subject to the flare effects because the fringes do not intersect the surface of the gelatin.

One result of flare is the diffraction of light spots, such as the beams from airport runway lights, which are viewed through a holographic combiner. Diffraction produces multiple order images of the light sources. Under certain conditions, particularly in night landings, substantial portions of the pilot's field of view may be obscured by the flare from runway lights.

Another use of holographic films has been in visors designed to protect eyes from damaging light exposure, such as might be encountered from an incoming laser beam. A holographic element incorporated into the visor diffracts and red-directs incoming laser light out of the field of vision. By suitable control of the light used to generate the hologram (angles, wavelengths, etc.), the degree of reflectivity/transmissivity of the hologram can be selectively determined and a cone of total reflection for a given wavelength can be provided to protect the user's eyes from incident damaging light beams. It is essential that the hologram be nearly 100% efficient in diffracting the damaging wavelengths of light at an angle so that they do not reach the eye. Otherwise, with an extremely intense beam, such as a laser beam, light which is not properly diffracted may be enough to damage the user's eyes. Improper diffraction can be caused by the flare effect.

As stated above, flare in slant fringe holograms is caused by surface effects. The periodic variations in the index of refraction at the surface of the gelatin layer cause the surface to act as a planar phase grating. The grating breaks up an incident light beam into two beams which are diffracted at equal but opposite angles to the incident beam. These beams differ from the reflection beam produced by the volume hologram. Hence, single points of light viewed through the hologram produce two first order diffraction beams even though the primary beam is reflected. In a laser eye protection device, the hologram protects against laser light directed at the user's eyes. A laser beam hitting the hologram from some other direction may be directed toward the eyes as a result of the flare effect, i.e., one of the flare points may fall in the cone of protection, thus exposing the user's eyes to possible damage. The present invention is directed to eliminating these unwanted flare points.

SUMMARY OF THE INVENTION

The present invention relates to techniques for eliminating or substantially reducing flare in slant fringe holograms caused by the surface effects described above. The techniques involve reducing the sensitivity of the gelatin recording medium at the surfaces thereof in a gradual or graduated manner, thereby eliminating "hard" or high contrast holographic fringes thereat.

One method in accordance with the present invention for reducing flare involves chemically desensitizing the surface layer with a short burst of gas or vapor which reacts with the light sensitive material at the outer surface thereof to harden and desensitize said surface. The gas or vapor gradually diffuses into the volume of the gelatin layer to produce a gradient of increasing sensitivity. Where the photoreactive layer is dichromated gelatin (e.g., a phase hologram), formaldehyde is a suitable gas; for a silver halide layer (e.g., an amplitude hologram) hydrogen sulfide is effective. Such a procedure is most easily applied to the outer surface of the gelatin layer, i.e., the surface remote from the substrate. However, techniques of gel transfer have been developed which would allow transfer of a gelatin material to a new substrate, so that the former inner surface, i.e., the surface adjacent the substrate, is now the outer surface, and vice versa. Repetition of the chemical treatment could then be used to modify the former inner surface. This method is most useful where high efficiency holograms are needed and where a small amount of diffraction by a surface grating would be a problem, such as in laser eye protection visors.

The preferred method in accordance with the invention for reducing flare involves lowering the fringe modulation at the gelatin surfaces, by optically exposing both surfaces, either before or after the coherent light exposure, with an incoherent light source of such wavelength that the light is highly absorbed and thus penetrates only a short distance into the material. The light uses up available photoreactive sites in the recording material, thereby diminishing the ability of the material to record high contrast fringes (pre-exposure) or reducing the contrast of previously recorded fringes (post-exposure). The penetrating light develops an absorbance gradient, resulting in a gradual reduction of sensitivity of the recording medium toward the surfaces thus exposed. Absorbance of the light may be increased by adding a dye to the gelatin layer. In the dichromated gelatin example, the dye may be the dichromate itself if the proper wavelength (e.g., 3660 Å) is selected. Such a procedure results in a variation in sensitivity as a function of depth, thereby eliminating all high contrast holographic fringes at the surfaces of the gelatin layer while preserving high contrast holographic fringes in the interior of the gelatin layer.

Another method in accordance with the invention for eliminating flare in slant fringe holograms involves providing multiple layers of light sensitive material, such as dichromated gelatin, with each layer having a different sensitivity to light. The sensitivity of the recording medium can thus be increased as a function of depth, either step-wise or continuously, depending upon whether diffusion occurs between layers. In accordance with this method, the number of layers may be as few as two or as many as nine or more to accomplish the desired effect. By using multiple layers, there is either a gradual blurring (lowering of contrast) of the fringes toward the surfaces of the recording medium or a series of increasingly lower contrast fringes within the respective layers progressing towards the surfaces of the recording medium. In either case, the resultant extraneous diffraction is less than that which would be present with a single high contrast fringe.

The desired desensitizing effect may be provided in the multiple layer technique by alternative procedures.

A first procedure involves coating each layer with identical material but, after each layer is coated, all coated layers are exposed to incoherent light. Such exposure reduces sensitivity to coherent light as a function of exposure time. Thus, the first layer coated (adjacent the substrate) will have the lowest sensitivity to coherent light; the next layer, the next lowest sensitivity to light, etc. This procedure only reduces flare which is generated at the inner surface of the medium and does not eliminate flare which is generated at the outer surface. Hence, it has limited utility and is thus not preferred.

A second procedure involves the use of heat to desensitize the layers as each additional layer is added. This would produce the same results and the same limitations as those described for the first procedure.

If desired, flare generated at the outer surface in the two foregoing procedures could be eliminated by treating that surface in accordance with the chemical desensitization method described above.

A preferred procedure results in improvement at both surfaces of the material and involves varying the inherent light sensitivity of each layer. One way of accomplishing this is to vary the concentration of the sensitizer in each layer, e.g., the dichromate ion in dichromated gelatin or the grain size in silver halide.

The three preceding procedures do not involve diffusion between layers and thus provide multiple step sensitivity. A fourth procedure allows diffusion between layers and thereby gives a continuous change in sensitivity. In a three-layer system utilizing this fourth procedure, for example, the inner and outer layers would have no inherent light sensitivity and would only gain some light sensitivity by diffusion of sensitizer from the light sensitive center layer.

The various methods which may be employed in the practice of the present invention all serve to vary the sensitivity of the light sensitive medium as a function of depth, with the result that there is no definite end to a high contrast holographic fringe that has been recorded in the medium. A high contrast termination of the fringes would give rise to a thin surface grating which would diffract light differently from the desired volume hologram recorded within the recording medium. The thin surface grating would be effectively about 0.2 microns thick. Thus, if the fringe edge is blurred over a depth which is greater than 0.1 microns from the surface of the recording medium, the brightness of the unwanted extraneous diffraction will be substantially reduced. Accordingly, the effectiveness of a HUD combiner or a laser eye protection visor, as the case may be, employing holographic films treated in the manner of the present invention is improved because the unwanted flare effects resulting from thin surface gratings are substantially reduced or eliminated. The present invention will be useful for any volume phase holograms that act as off-axis reflection devices or that have holographic power (i.e., where the effective shape of the holographic element does not match the curvature of the glass substrate).

Objects of the invention are, therefore, to provide improved holograms, to provide holograms which are free of flare effects, and to provide methods for making flare-free holograms.

A further object of the invention is to provide improved holographic HUD's and improved eye protection visors.

Still another object of the invention is to provide a method for reducing or eliminating extraneous diffraction in slant fringe holograms caused by surface effects comprising applying a layer of light sensitive holographic recording medium to a substrate, treating said layer to reduce light sensitivity adjacent surface regions thereof, and exposing the recording medium to coherent light to record a slant fringe pattern therein.

Yet another object of the invention is to provide a slant fringe hologram comprising a substrate, a layer of holographic recording medium mounted on said substrate, said layer having a slant fringe pattern recorded therein, the fringe pattern adjacent surface regions of the medium being substantially reduced in contrast from the fringe pattern in the interior of the holographic medium.

These and other and further objects and features of the invention are apparent in the disclosure which includes the above and below specification and claims and drawings.

BRIEF DESCRIPTION OF THE DRAWING

FIGS. 4(A) and 4(B) are, respectively, a cross sectional schematic representation of a holographic recording structure illustrating a second method in accordance with the invention and a graphical representation of the resultant sensitivity profile obtained thereby;

FIGS. 5(A) and 5(B) are, respectively, a cross sectional schematic representation of a holographic recording structure illustrating still another method in accordance with the invention and a graphical representation of the resultant sensitivity profile obtained thereby;

FIGS. 6(A) and 6(B) are, respectively, a cross sectional schematic representation of a holographic recording structure illustrating yet another method in accordance with the invention and a graphical representation of the resultant sensitivity profile obtained thereby; and FIGS. 7(A) and 7(B) are, respectively, a cross sectional schematic representation of a holographic recording structure illustrating a further method in accordance with the invention and a graphical representation of the resultant sensitivity profile obtained thereby.

DESCRIPTION OF THE PREFERRED EMBODIMENTS

Figure 1A:
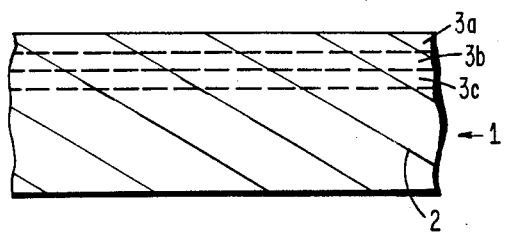
FIGS. 1(A) and 1(B) are, respectively, a cross sectional schematic representation of a slant fringe hologram and a schematic side elevation representing the functional effect of the surface phase grating associated therewith.
Figure 1B:

A typical slant fringe hologram is shown in FIG. 1(A). The index of refraction of the holographic recording medium 1 varies sinusoidally throughout its volume with the fringes 2 representing areas of maximum (or minimum) index of refraction and the areas midway between the fringes 2 being the areas of minimum (or maximum) index of refraction. If the hologram is visualized as a collection of thin, superimposed sheets 3A, 3B, 3C, etc., having a thickness far less than the wavelength of the hologram construction beams, it will be appreciated that the thin sheet 3A immediately adjacent the surface of the recording medium 1 will act as the phase grating shown in FIG. 1(B). The low areas 4 of the grating have low index of refraction and the raised areas 5 have high index of refraction. The thin grating in the surface region of the recording medium 1 produces extra diffraction rays as shown in FIG. 2.

Figure 2:
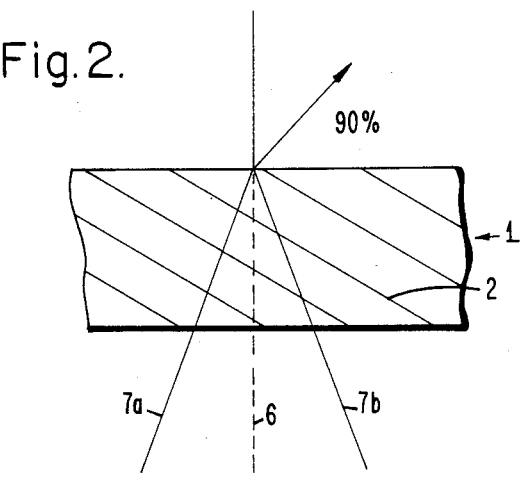
FIG. 2 is a cross sectional schematic representation of a slant fringe reflection hologram in the playback mode of operation.

Theoretically, a reflection volume hologram with slant fringes 2 will reflect, for example, 90% of incident light in a given direction and will transmit the remaining 10% straight through the hologram (as indicated by the dashed line 6 shown in FIG. 2). However, the thin phase grating in the surface region of the recording material 1 causes the transmitted light to break up into two separate beams 7A and 7B which differ in direction from the theoretical transmission path 6. Those extra diffraction beams degrade the quality of the image produced by the hologram by creating "flare," a condition where one image appears as two separate images, and also result in light beams being sent into regions where no light is desired. The latter problem is particularly important in laser eye protection devices.

The intensity of the extra diffracted beam produced by flare effects is proportional to the square of a quantity equal to the effective thickness of the thin surface grating multiplied by delta n, the difference between the maximum and minimum indices of refraction in the hologram. Thus, the intensity of the diffracted beam theoretically could be reduced by reducing either of the variables, delta n or effective thickness. Reduction of the effective thickness of the grating layer is not a practical solution because the thickness of a gelatin layer is difficult to control. Delta n can be controlled but, if it is reduced throughout the hologram, the efficiency of the hologram will be reduced. High efficiency holograms are needed, particularly for laser eye protection applications. The present invention eliminates the surface phase grating effect by eliminating high fringe contrast only at surface regions of the gelatin layer while preserving delta n at an effective value throughout the remainder of the gelatin layer.

The present invention is based upon the theory that a gradual interface bondary along surface regions of the recording medium will reduce the diffractive power of those regions. The gradual interface can be visualized as a collection of thin, superimposed sheets, the difference between the minimum and maximum index of refraction of each sheet incrementally decreasing toward the surface of the medium. For example, if the refractive index difference in the volume hologram was 0.1, the index difference in the innermost thin sheet of the surface region could be 0.09, the index difference in the next outermost thin sheet could be 0.08, and so on, with the index difference in the outermost thin sheet being zero. An extra diffracted beam produced by the flare effect will then have an intensity which is equal to the sum of the intensities contributed by the individual thin sheets. Because intensity can be defined as:

$$I \sim \Delta n^2 t$$

where

I is intensity, $\Delta n$ is the difference between the minimum and maximum index of refraction in a thin sheet, and t is the thickness of a thin sheet, it will be readily appreciated that an extra diffracted beam produced by thin sheets having decreasing $\Delta n$ will have an intensity which is far less than the intensity of a beam produced by a surface region having a uniform $\Delta n$ equal to the $\Delta n$ of the volume hologram. Hence, the gradual boundary concept will reduce the intensity of the extra diffracted beam to a level at which it becomes insignificant.

The gradual boundary concept can be implemented in various ways within the scope of the present invention.

Figure 3A:
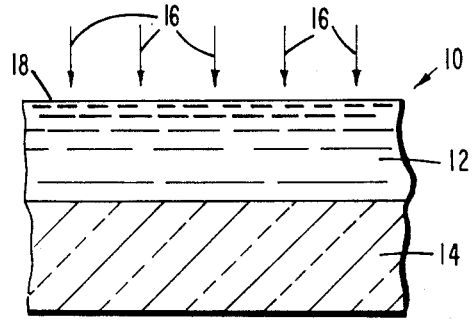
FIGS. 3(A) and 3(B) are, respectively, a cross sectional schematic representation of a holographic recording structure illustrating one particular method in accordance with the present invention and a graphical representation of the resultant sensitivity profile obtained thereby.

FIG. 3(A) schematically represents a portion of a holographic structure 10 comprising a layer 12 of a holographic recording medium, typically dichromated gelatin, applied to a support material 14, which may be a glass plate. FIG. 3(A) shows the layer 12 being treated with a short burst of gas or vapor, represented by the arrows 16. This gas or vapor reacts with the light sensitive layer 12 at the upper surface 18 and gradually diffuses, to a limited extent, into the layer 12.

Figure 3B:
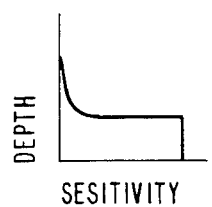

In one embodiment, a 0.010 inch layer 12 of dichromated gelatin solution (20 m molar dichromate—8% gelatin) is coated onto the substrate 14. It is allowed to gel at 5° C. and partially dried. A short burst (<10 seconds) of acetaldehyde vapor at near atmospheric pressure is passed over the gel. The outer layer of dichromate is reduced by the aldehyde and loses its light sensitivity. During the short time period of exposure to the vapor, the aldehyde diffuses only slightly into the interior of the gel. FIG. 3(B) shows the sensitivity profile for the layer 12 resulting from the foregoing treatment. At the upper surface 18, the sensitivity is essentially zero and it increases with increasing depth of the layer 12 until a level corresponding to the normal untreated sensitivity is reached.

The foregoing procedure only reduces fringe contrast at the outer surface 18 and, to a lesser extent, to the depth that the aldehyde penetrates. To obtain flare reduction at both surfaces, the gelatin layer 12 can be coated loosely on the substrate 14 so that it can be removed, turned over, and attached to another substrate at the already treated surface layer 18. A new exposure to the aldehyde vapor, repeating the process of FIG. 3(A), is then used to desensitize the newly exposed surface. Alternatively, the gas treatment procedure can be applied to the outer surface of a hologram made in accordance with the multiple layer techniques described below with reference to FIGS. 5(A) and (B) to obtain flare reduction at both surfaces.

A suitable method for gel transfer is to coat the layer 12 on a substrate which is lightly spread with a mold release, transferring by adhering the gelatin to a second substrate with an optical adhesive such as Norland 61 (which is cured by ultraviolet light), and then popping the gelatin loose from the first substrate. An alternative approach is to use a thermal setting epoxy, such as Epotech 302-3, which does not require ultraviolet light for curing and thus avoids any possible reaction in the gelatin from the ultraviolet light. Still another method of gel transfer involves coating the gelatin onto partially hardened Norland 61 attached to a glass substrate. The gelatin can then be released from the Norland 61 by heating at 70°-80° C. for a few minutes.

FIG. 4(A) schematically represents a portion of a holographic structure 20 comprising a layer 22 of a holographic recording medium, typically dichromated gelatin, applied to a support material 24 such as a glass plate. FIG. 4(A) shows the layer 22 being optically exposed to incoherent light, as indicated by the arrows 26, 28. The light originates from a pair of incoherent light sources on opposite sides of the structure 20, that from the underside as indicated by the arrows 28 reaching the inner surface 29 through the glass plate 24. The wavelength of the incoherent light is selected such that the light penetrates only a short distance so the material 22. A dye (not shown) may be included in the layer 22 to increase the light absorbance of the material.

In one embodiment, a dichromated gelatin layer (approximately 14 microns thick containing $3 \times 10^{17}$ molecules dichromate per $cm^2$) is exposed on both sides to light from a filtered mercury arc lamp. This exposure to incoherent light may occur either before or after exposure of the layer 22 to the coherent hologram construction beams of 5145 Angstroms. The incoherent illumination can be within the range of 2000-5000 Angstroms, preferably 3660 Angstroms, and within a range from 70 to 420 millijoules per $cm^2$. The optical absorbance of the layer at 3660 Angstroms is 5.2 and at 5145 Angstroms it is 0.06. The 3660 Angstrom energy is reduced to 5% of the incident level within 3.2 microns of the surface. Thus, the unreacted dichromated gelatin layer available for subsequent hologram exposure at 5145 Angstroms is approximately 8 microns or less with a gradual lowering of sensitivity over the outer 3.2 microns. This exceeds the 0.1 micron requirement for blurring of the fringe edge in order to avoid the adverse flare effects of thin surface gratings.

FIG. 4(B) shows the sensitivity profile for the layer 32 after treatment in the manner described. It shows a substantial reduction in sensitivity within the outer three microns on each side of the eight micron central region.

When an untreated layer 22 was interrogated with a HeNe laser, there were two sets of flare spots which were apparent. These corresponded to approximately 44° and 39° diffraction angles. Sample layers 22 which were treated in the manner described above had no 44° spot and the brightness of the 39° spot varied visibly as a function of pre-holographic exposure, as did the brightness of the holographic image. The latter effect is due to the fact that the thickness of unhardened gelatin which remains for the holographic exposure is reduced. The technique works equally well whether the UV exposure of the gelatin layer 22 is before or after the holographic exposure.

FIG. 5(A) schematically represents a portion of a holographic structure 30 having multiple layers 32 making up a recording medium mounted on a support structure 34. Each layer 32 has a different sensitivity to light so that the sensitivity of the recording medium is reduced as a function of depth. For the structure 30 of FIG. 5(A), the reduction in sensitivity occurs as a stepwise function, as shown in the sensitivity profile of FIG. 5(B). However, the sensitivity can be reduced continuously if diffusion is permitted to occur between the layers 32. Although three layers 32 are shown in FIG. 5(A), it is possible to provide as many as nine or more layers in order to develop the desired sensitivity reduction profile. By using multiple layers 32, there is either a gradual blurring of the fringes toward the outer surface or a series of increasingly lower contrast fringes in the respective layers 32 progressing toward the outer surface. In either case, the resultant extraneous diffraction will be less than it would be with a single high contrast fringe pattern at the outer surface.

Although multiple layer holographic structures having differing sensitivities in each layer are known, the present invention lies in arranging the respective layers so to to achieve flare reduction. The prior structures were not concerned with flare reduction and were incapable of achieving that result.

In a first procedure for forming the hologram 30 of FIG. 5(A), each of the three layers 32 is formed by laying down 0.005 inch of dichromated gelatin (0.020 m ammonium dichromate—8% gelatin). Each layer is fully dried for approximately six hours at room temperature and thereafter baked for 5–10 minutes at 50° C. before the next layer is laid down. As each layer is added, it is exposed to fluorescent light corresponding to 200 millijoules of energy. The fluorescent light is directed at the layers 32 through the support member 34, as indicated by the arrows 36. Subsequently, the recording medium is exposed to coherent light to develop the holographic fringe pattern in the medium. With this embodiment, the best theoretical improvement in the slant fringe flare reduction is only 50% because only the lower end of the high contrast fringe, i.e., the end adjacent the support member 34, is lowered in contrast. Hence, the procedure has limited utility and is not preferred.

In a variation of the procedure just described with respect to FIG. 5(A), desensitization is achieved thermally rather than with fluorescent light exposure. In this procedure, preparation of the layers is the same as previously described, except that the baking time for each layer is extended to 20 minutes at 50° C. before laying down the next gelatin layer. The sensitivity profile shown in FIG. 5(B) is applicable to this procedure. The hardening effect caused by baking of the layers is additive as additional layers are processed.

FIG. 6(A) schematically represents a portion of a holographic structure 40 having a plurality of individual sub-layers 42a, 42b, 42c making up a recording medium which is applied to a support material 44. Three sub-layers are shown in FIG. 6(A); up to nine or more layers may be provided. In one embodiment, three separate layers, each of 0.005 inches of dichromated gelatin solution (dry thickness of approximately 7 microns—variable ammonium dichromate—8% gelatin), is coated onto the substrate 44. Each layer is fully dried and baked for 5–10 minutes at 50° C. before the next layer is laid down. The two outer layers 42a and 42c have diluted dichromate concentration (e.g., 10 m molar for three layers; 0 m molar for nine layers) while the center layer 42b has a standard 20 m molar concentration of ammonium dichromate. Any additional intermediate layers are diluted to a concentration level which is halfway between those of the immediately adjacent layers. The optical sensitivity of a layer is related to its dichromate concentration.

FIG. 6(B) shows the sensitivity profile for the three-layer configuration of FIG. 6(A). It reflects an improved reduction in the slant fringe flare over the maximum theoretical improvement for the structures of FIG. 5(A) because the fringes are reduced in contrast at both the substrate interface and the outer surface of the recording medium.

FIG. 7(A) schematically represents a portion of a holographic structure 50 in which the recording medium has a layer of dichromated gelatin 52 sandwiched between layers 53a and 53b of plain gelatin, the entire gelatin block being applied to a support material 54. In the formation of the structure 50, a layer of gelatin solution (8% gelatin—no dichromate) with a thickness of 0.005 inch was coated onto a glass plate 54. This was allowed to gel at 5° C. and dry slightly. A 0.010 thick layer 52 of dichromate gelatin solution (8% gelatin—0.020 m ammonium dichromate) was laid over the previously deposited layer 53b. This was allowed to gel and dry partially. A third layer 53a with no dichromate was applied to the layer 52 to a thickness of 0.005 inch. After the third layer jelled, all three layers were dried to the level needed for holographic exposures. The interfaces 56a and 56b become minute diffusion areas in which the dichromate of the center layer 52 diffuses outwardly into the outer layers 53A and 53B. The interfaces 56A and 56B have a thickness slightly in excess of 0.1 microns. Since the thin surface grating for the slant fringe is effectively about 0.1 microns thick, blurring fringe contrast over a depth greater than 0.1 micron, as occurs with the diffusion layers 56a, 56b, effectively reduces the unwanted slant fringe flare effects. The resultant sensitivity diagram is shown in FIG. 7(B). It shows essentially zero sensitivity for the plain gelatin layers 53a and 53b, normal sensitivity for the dichromated gelatin layer 52, and the steep sloped sides transitioning between the two levels, corresponding to the diffusion areas along the interfaces 56a, 56b.

The foregoing multiple layer techniques are particularly useful where it is necessary to have precision in hologram thickness. The gaseous diffusion and optical desensitization techniques of FIGS. 3(A) and 4(A), respectively, produce less precision in hologram thickness.

Although the diffusion technique has been discussed only with reference to the structure of FIG. 7(A), it will be appreciated that it is equally applicable to the structures of FIGS. 5(A) and 6(A) and other similar structures.

Disclosed herein are various methods for alleviating flare problems encountered in slant fringe holograms used as optical elements in head-up displays, laser eye protection devices, and the like. Each of the disclosed methods is directed to modifying the contrast of the fringe pattern at the boundary of the holographic medium, thereby avoiding the thin surface phase grating effect which would otherwise be present. Modification of the fringe pattern by eliminating or substantially reducing fringe contrast only at surface regions of the recording medium in the manner disclosed effectively reduces or eliminates the unwanted extraneous diffraction or flare which interferes with the effective use of holographic elements while, at the same time, preserving the high efficiency of the volume hologram recorded in the interior of the holographic medium.

Although there have been described above specific methods for reducing holographic flare in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Method for reducing extraneous diffraction caused by surface effects in volume slant fringe holograms comprising:

applying a layer of light sensitive holographic recording medium to a substrate;

treating said layer to reduce light sensitivity at and adjacent surface regions thereof without substantially reducing light sensitivity at interim regions thereof; and exposing the recording medium to coherent light to record a volume slant fringe pattern therein.

2. The method of claim 1 wherein the treating step comprises exposing surfaces of the medium to highly absorbed incoherent light.

3. The method of claim 2 wherein the holographic medium is dichromated gelatin and the incoherent light is at a wavelength of approximately 3660 Angstroms.

4. The method of claim 2 wherein the region affected by the incoherent light penetrates to a depth in excess of about 0.1 microns from said exposed surfaces.

5. The method of claim 1 wherein the treating step comprises applying a plurality of additional layers of dichromated gelatin in succession to said substrate to form the recording medium.

6. The method of claim 1 wherein said surface regions comprise opposed inner and outer surfaces of the recording medium.

7. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at interior regions thereof; and exposing the recording medium to coherent light to record a slant fringe pattern therein, wherein the treating step comprises applying a burst of vaporous substance to an outer surface of the medium and diffusing the substance into the medium for a limited distance.

8. The method of claim 7 wherein the medium is dichromated gelatin and the substance is formaldehyde.

9. The method of claim 7 wherein the medium is dichromated gelatin and the substance is acetaldehyde vapor at near atmospheric pressure, and wherein the applying step comprises passing the acetaldehyde over the gelatin for a period of about ten seconds.

10. The method of claim 7 further including the steps of removing the recording medium from the substrate, turning over the recording medium, re-applying the recording medium to a substrate, and applying a burst of vaporous substance to a newly exposed surface of the recording medium.

11. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at interior regions thereof, and exposing the recording medium to coherent light to record a slant fringe pattern therein, wherein the treating step comprises exposing surfaces of the medium to highly absorbed incoherent light and wherein the medium includes dye which promotes absorbance of said incoherent light.

12. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at other regions thereof, and exposing the recording medium to coherent light to record a slant fringe pattern therein, wherein the treating step comprises applying a plurality of additional layers of dichromated gelatin in succession to form the recording medium and further comprising exposing the recording medium to incoherent light after laying down each layer.

13. The method of claim 12 further comprising applying a burst of vaporous substance to an outer surface of the medium and diffusing the substance into the medium for a limited distance to reduce light sensitivity thereof.

14. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at interior regions thereof, and exposing the recording medium to coherent light to record a slant fringe pattern therein, wherein the treating step comprises applying a plurality of additional layers of dichromated gelatin in succession to form the recording medium and further comprising heat treating the recording medium after laying down each layer.

15. The method of claim 14 further comprising applying a burst of vaporous substance to an outer surface of the medium and diffusing the substance into the medium for a limited distance to reduce light sensitivity thereof.

16. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at interior regions thereof, and exposing the recording medium to coherent light to record a slant fringe pattern therein, wherein the treating step comprises applying at least one non-photosensitive material layer along the support material, applying a light sensitive material layer along an outer surface of the non-photosensitive material layer, and applying a subsequent non-photosensitive material layer on the light sensitive material layer such that diffusion of light sensitive material occurs along interface boundaries between the light sensitive material layer and the non-photosensitive material layers to a thickness of at least 0.1 microns.

17. A volume slant fringe hologram comprising:
a substrate;
a layer of holographic recording medium mounted on said substrate, said layer having a volume slant fringe pattern recorded therein, the fringe pattern at and adjacent surface regions of the medium being substantially reduced in contrast from the fringe pattern in the interior of the holographic medium.

18. The device of claim 17 wherein said surface regions comprise regions adjacent opposed inner and outer surfaces of the holographic medium.

19. A slant fringe hologram comprising a substrate, a holographic recording medium mounted on said substrate, said medium having a slant fringe pattern recorded therein, the fringe pattern at and adjacent surface regions of the medium being substantially reduced in contrast from the fringe pattern in the interior of the holographic medium, wherein said holographic medium comprises a plurality of layers having different degrees of light sensitivity.

20. The device of claim 19 wherein the plurality of layers comprises at least one layer of light sensitive material sandwiched between layers of non-photosensitive material, the interface regions between the light sensitive layer and the non-photosensitive layers comprising diffusion regions of reduced light sensitivity.

21. The device of claim 20 wherein said diffusion regions exceed 0.1 microns in thickness.

22. Method for reducing extraneous diffraction caused by surface effects in slant fringe holograms comprising applying a layer of light sensitive holographic recording medium to a substrate, treating said layer to reduce light sensitivity adjacent surface regions thereof, and exposing the recording medium to coherent light to record a slant fringe pattern therein, wherein the treating step comprises applying a first outer layer of light sensitive material along the support material, applying an inner layer of light sensitive material over the first outer layer, and applying a second outer layer of light sensitive material over the inner layer, said first and second outer layers having lower degrees of light sensitivity than said inner layer.

23. The method of claim 22 wherein the holographic medium is dichromated gelatin and the incoherent light is at a wavelength of approximately 3660 Angstroms.

24. A slant fringe hologram comprising a substrate, a layer of holographic recording medium mounted on said substrate, said layer having a slant fringe pattern recorded therein, the fringe pattern at and adjacent surface regions of the medium being substantially reduced in contrast from the fringe pattern in the interior of the holographic medium, said surface regions comprising opposed inner and outer surfaces of the holographic medium.

25. Method for reducing extraneous diffraction caused by surface effects in slant fringe holograms comprising applying a layer of light sensitive holographic recording medium to a substrate, treating said layer to reduce light sensitivity at and adjacent surface regions thereof without substantially reducing light sensitivity at interior regions thereof, and exposing the recording medium to coherent light to record a slant fringe pattern therein, wherein the treating step comprises separately exposing said opposed surface regions to highly absorbed incoherent light.

26. Method for reducing extraneous diffraction caused by surface effects in volume slant fringe holograms comprising:
 applying a layer of light sensitive holographic recording medium to a substrate;
 treating said layer to reduce light sensitivity by exposing surfaces of the medium to highly absorbed incoherent light at and adjacent surface regions thereof without substantially reducing light sensitivity at interim regions thereof; and
 exposing the recording medium to coherent light to record a volume slant fringe pattern therein.

* * * * *